United States Patent [19]

Schmiedberger et al.

[11] Patent Number: 5,199,041
[45] Date of Patent: Mar. 30, 1993

[54] MODULATION OF OXYGEN-IODINE LASER

[75] Inventors: Josef Schmiedberger; Jarmila Kodymová; Jiri Kovár; Otomar Spalek; Pavel Trenda, all of Prague, Czechoslovakia

[73] Assignee: Ceskoslovenká Akademie Ved, Prague, Czechoslovakia

[21] Appl. No.: 729,424

[22] Filed: Jul. 12, 1991

[30] Foreign Application Priority Data

Aug. 13, 1990 [CS] Czechoslovakia ............... 3967-90

[51] Int. Cl.$^5$ ............................................. H01S 3/09
[52] U.S. Cl. ................................. 372/89; 372/37; 372/55; 372/60; 372/26; 372/58; 372/70
[58] Field of Search .................. 372/89, 37, 55, 60, 372/26, 58, 69, 70

[56] References Cited

U.S. PATENT DOCUMENTS

| | | | |
|---|---|---|---|
| 4,348,766 | 9/1982 | Born | 372/89 |
| 4,475,199 | 10/1984 | Sanders et al. | 372/37 |
| 4,620,305 | 10/1986 | Flusberg | 372/37 |
| 4,653,062 | 3/1987 | Davis et al. | 372/89 |
| 4,780,880 | 10/1988 | Dickerson | 372/60 |
| 4,847,841 | 7/1989 | Lamprecht et al. | 372/37 |
| 4,897,851 | 1/1990 | Vecht et al. | 372/37 |

*Primary Examiner*—Georgia Y. Epps
*Attorney, Agent, or Firm*—Notaro & Michalos

[57] ABSTRACT

A method of modulating an oxygen-iodine laser comprises applying an external magnetic field having an intensity of up to 800 A.cm$^{-1}$ to the active zone of the laser and, at the same time, changing the magnetic field intensity to change the output power of the laser.

13 Claims, 1 Drawing Sheet

MODULATION OF OXYGEN-IODINE LASER

FIELD AND BACKGROUND OF THE INVENTION

The invention is concerned with a method of modulation of laser generation with continuous pumping of an oxygen-iodine laser especially, and with a device for performing this method.

Modern technological lasers with outputs of hundreds and thousands of watts are characterized by their multifunction ability, i.e., by the possibility to operate in both continuous and periodically pulsed regimes. A periodically pulsed regime is important for some laser technology of material processing (e.g. cutting, drilling, etc.). High-power $CO_2$ gas lasers and solid-state Nd:YAG lasers are the typical representatives used for these purposes till now. A chemical oxygen-iodine laser (hereinafter called COIL) which could be able to compete with the above mentioned lasers in the future has not had this possibility so far. Related iodine photodissociation lasers (IPL) can operate both in the continuous and pulsed regime. However, for the time being, their output power has not exceeded 10 watts only and efficiency is very low (about 0.1%). For these reasons, their use for technological purposes is hardly probable. Another related iodine laser working with a combined pumping (i.e. a combination of chemical and photodissociation pumping or chemical and discharge pumping-(ICL)) has all the subsystems of a COIL except for $I_2$ injection, instead of which they use the dissociation of perfluoralkyliodides. This makes these systems more complicated and rather expensive for industrial applications. These lasers operate in a pulsed regime only and, moreover, the subsystem of the iodides dissociation by means of either flashlamps or open discharges has a limited lifetime which would be reduced to several hours of operation in case of high repetition rates of 100-1000 Hz. A chemical oxygen-iodine laser (COIL) is the only type of iodine laser which can generate kilowatt output powers in cw (continuous wave) regime at the wavelength of 1.315 μm. However, a suitable method of modulation of its generation has not been worked out till now.

A Q-switching technique of the mechanical type (see F. Matsuzaka, T. Ohga, M. Imachi, T. Uchiyama "Q-switching Operation of Chemical Oxygen Iodine Laser", Proceedings of the 12th International Conference on Lasers and Applications, New Orleans, USA, pp. 223-227, Dec. 3-8, 1989) or the magnetic-optical type (see R. Highland, P. Crowell, G. Hager "A 630 Watt Average Power Q-switched Chemical Oxygen-Iodine Laser", Proceedings of the 12th International Conference on Lasers and Applications, New Orleans, USA pp. 228-236, Dec. 3-8, 1989) have been used for pulsing in cw COIL, nevertheless, these methods have substantial disadvantages. A COIL system is characterized by a low gain, a low output coupling and a near threshold generation (compared with IPL and ICL), therefore, the techniques and methods which could increase the intraresonator losses are not suitable. A piezoelectric modulation of mirror position to get a pulsed regime would be problematic because a COIL of usual construction has internal spherical mirrors and pressure differences between the inner and outer sides of the mirrors is 100 kPa approximately. A pulse injection technique (e.g. by means of IPL) is possible theoretically but it has not been realized. A pulsing of the chemical pumping seems to be unsuitable for this purpose, too.

Two patents related to COIL found in available databases do not deal with an appropriate method of modulation of generation in this type of laser. One of them, U.S. Pat. No. 4,653,062, concerns a new construction for introducing and mixing of singlet oxygen and iodine monochloride which differs from a usual source of atomic iodine in the sense that it enables an increase of duct pressure in the laser. Another U.S. Pat. No. 4,780,880 solves the question of enhancing the laser action in COIL wherein a gas stream having a desired reactant gas concentration profile is combined with a diluent gas concentration profile using hydrogen as the diluent gas.

SUMMARY OF THE INVENTION

This invention deals with a simple method of modulation of COIL generation which is suitable for various functional regimes. The invention also includes a device for performing this method.

The principle of the invention is in the fact that the external magnetic field of the intensity in the range of 0-800 $A.cm^{-1}$, advantageously to 400 $A.cm^{-1}$, penetrating through the laser active zone is used to control a small-signal gain and thus a time dependence of the output power on the magnetic field intensity. Particular regimes could be modulated according to this invention as follows:

In a periodically pulsed regime of the output power generation, a time course of the magnetic field intensity is changed from zero to the value corresponding to the threshold or to some underthreshold value of the gain.

Switching-off of the output power generation is caused by an increasing the magnetic field intensity up to the value which brings about a lowering of the gain to the threshold or underthreshold value.

A continuous adjustment of the output power within the range 0 to 100% is carried out by continuously changing the magnetic field intensity from zero to the value corresponding to a threshold small-signal gain.

A time stabilization of the output power is carried out by changing magnetic field intensity which compensates the undesirable changes of the output power.

It is advantageous if the magnetic field is oriented perpendicularly to the resonator axis and to the gas flowing through the active zone.

The device suitable to perform the gain modulation in cw COIL according to this invention is based on the laser system of common construction. The principle of the new set-up consists in adding an external source of magnetic field to the active zone of the laser body. A magnetic field source is represented here by two rectangular coils without core. It is advantageous to use coils ensuring a quasihelmholtz geometry in transverse profile in order to achieve a homogeneous profile of magnetic field in a plane perpendicular to the optical axis of the resonator. An applied current feeds both the coils in the same sense.

The scope of application of this invention may be as follows:

A periodically pulsed operation of COIL can be achieved by transforming from the original continuous regime by periodically pulsed magnetic modulation without a measurable loss of mean output power and with the same repetition rate as the rate of the modulation. A power enhancement in pulse can exceed many times the value of continuous (mean) power and a pulse length can be shorter by the same factor in comparison with the optimal pulse period. If the modulation frequency is lower than the optimal one corresponding to a gas exchange in the active zone at conservation of a sufficient rate of switching-off the magnetic field, the pulse generation occurs with a lower repetition rate keeping all the parameters of a single pulse the same but the mean output power is lowered. On the other hand, if the modulation frequency is higher than corresponds to the optimal one, changes of both the mean power and single pulse parameters can be observed.

A single event jump magnetic modulation of gain can be used as a fast switch-off of the laser generation which would be much faster than stopping the chemical pumping or $I_2$ loading into the laser active zone or applying a mechanical shutter in the resonator.

A dependence of the mean value of the output power on the repetition rate of pulse generation with respect to a gas flow velocity may be used as a new method to measure this parameter.

A non-pulse, relatively slower changes of gain caused by a magnetic field could be further used for continuous adjustment of cw output power level in the range of 0–100% of attainable output power with any time course and without the necessity of changing the parameters of chemical pumping or $I_2$ injection, and monitoring the output power with a negative feedback controlling the magnetic field intensity in the active zone and thus to achieve a magnetic stabilization of output power.

Fluctuations of laser pumping and consequently laser generation of output power can be compensated in this way.

The magnetic modulation of gain seems to be an advantageous and promising method for improving the technical parameters of COIL systems, especially in electrically controlling the output power. The possibility of different temporal regimes or selected timings of generation extends the practical utilization of this laser system because of its multifunctionality.

The device according to the invention posseses a sufficient speed of switching at the repetition rate up to several kHz. Another advantage of this device is the fact that neither any part of the magnetic field source is in a direct contact with an aggressive laser medium nor interferes with the optical path of the beam in the resonator. No substantial changes in the laser construction and no cooling are necessary. Singlet oxygen $O_2(^1\Delta_g)$ is produced by a chemical method, however, the invention could be applied also to the device with a different method used for singlet oxygen production.

A magnetic field can switch the gain between an underthreshold value (a laser generation does not occure due to the presence of magnetic field) and "natural" unsaturated above-threshold value (the laser generation occures without a magnetic field). A magnetic gain switching is made possible by the gain dependence on the magnetic field intensity. A direct magnetic modulation of gain utilizes the Zeeman splitting of hyperfine structure on the laser transition 3–4 of the iodine atoms $^2P_{\frac{1}{2}}-^2P_{3/2}$ in the active medium created by the reaction of singlet oxygen with atomic iodine. A significant monotonic decrease in the gain coefficient on the strongest transition 3–4 of atomic iodine in the range of magnetic field approx. up to 400 A.cm$^{-1}$ and at low pressures of laser gas is a consequence of the fact that an increase in magnetic field leads to spreading a mutual distance of particular Zeeman components on the strongest transition 3–4 of the spectrum. The mutual distance spreads to the value which is comparable with their line width and a sum of particular components on the mean frequency of the summary line profile decreases much faster than on the transition 2–3 or 3—3. The application of higher magnetic field intensities than 400 A.cm$^{-1}$ is possible, however, energetically disadvantageous because the laser generation can occure also on the transition 2—2 and the gain thus grows. The gain decrease to an underthreshold level during a period significantly shorter than the mean lifetime of atomic iodine in excited state (the order of 1 ms) is achieved by means of magnetic modulation of laser generation. In this way, the underthreshold condition for quenching the laser generation is fulfilled:

$$\frac{2\,\alpha_{34}(H)\cdot 1}{\delta_o + \delta_e} < 1 \tag{1}$$

where $\alpha_{34}(H)$ is the unsaturated small-signal gain on the transition 3–4 influenced by the magnetic field intensity H (A.cm$^{-1}$), 1 the active zone (medium) length (cm), $\delta_o$ the intraresonator losses and $\delta_e$ the output coupling of the resonator ($\delta_e = \delta_1 + \delta_2$, where $\delta_1$ and $\delta_2$ are transmissions of resonator mirrors).

The laser is kept under the threshold of generation as long as the whole active zone is filled with a new gas. Then the external magnetic field is switched-off and the gain is increased again. The stored energy is then radiated in a form of a short intensive laser pulse. Afterwards the whole cycle is repeated.

In the following examples there are given measured values of magnetic field intensities used for a magnetic switch-off the laser generation (a), for a repetitively pulsed laser generation (b), to control an output power (c), to stabilize an output power (gain) (d).

a) The magnetic field intensity of 200 A.cm$^{-1}$ in the middle of active zone (on the optical axis) was sufficient to quench the laser generation. A generation of cw output power of 30 W with corresponding small-signal gain $\alpha_{34}(H=0)=1,50.10^{-3}$ cm$^{-1}$ was switched-off due to gain lowering to or below the threshold $\alpha_{34}(H=\max 200$ A.cm$^{-1})\leq 1,41.10^{-3}$ cm$^{-1}$.

b) The magnetic field intensity of 80 A.cm$^{-1}$ in the middle of active zone (on the optical axis) at modulation frequency of 1560 Hz was sufficient to achieve a periodically pulsed regime of laser generation. The pulse period was 0.64 ms and the laser pulse length was 200 $\mu$s. The mean value of output power (15 W) was conserved (equal to cw output power without modulation) and a power enhancement in a pulse was equal to 3.2.

c) An output power was continuously adjustable in the range of 0–30 W at the magnetic field intensity in the range 0–200 A.cm$^{-1}$ in the middle of active zone (on the optical axis).

d) A stabilization of output power made it possible to compensate its fluctuation in the range of ±5% on the output power level of 10 W.

DESCRIPTION OF THE PREFERRED EMBODIMENT

Figure 1:
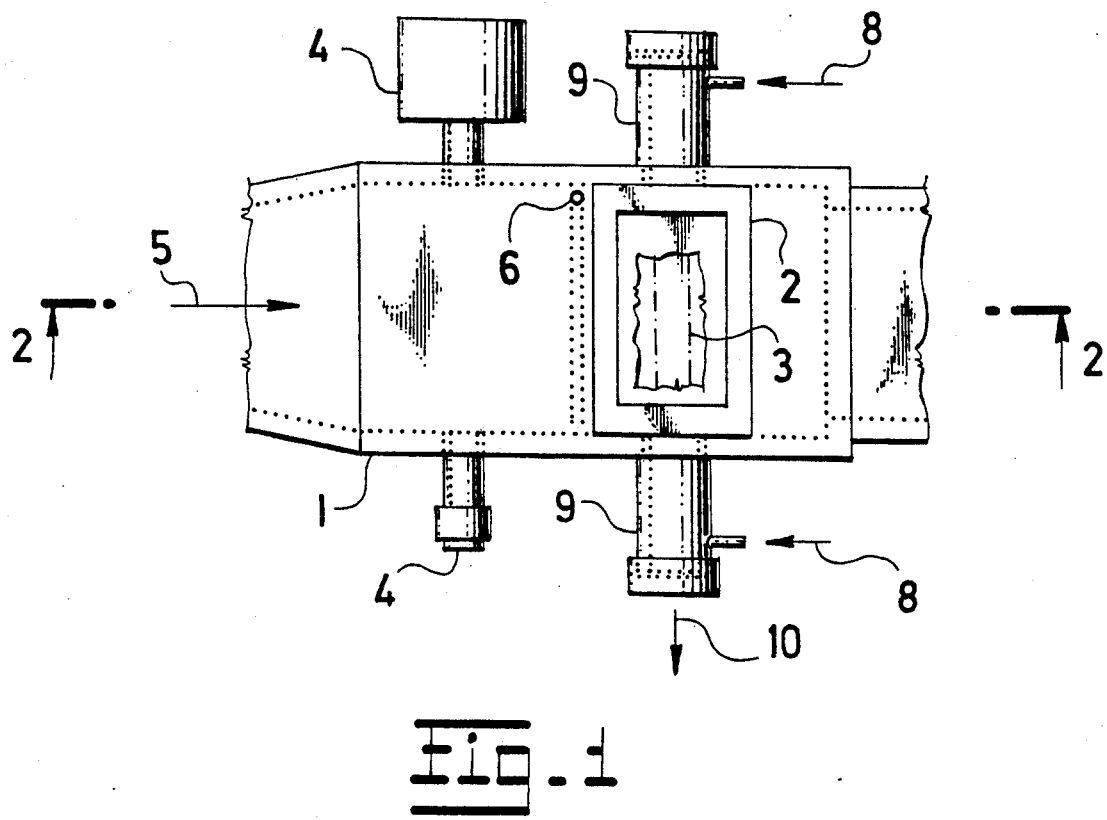
FIG. 1 and FIG. 2 are plan and front side sectional views respectively, of an experimental set-up for application of the magnetic gain modulation in COIL, however, without its usually well-known parts, i.e. the singlet oxygen generator and vacuum pumping Roots system.
Figure 2:
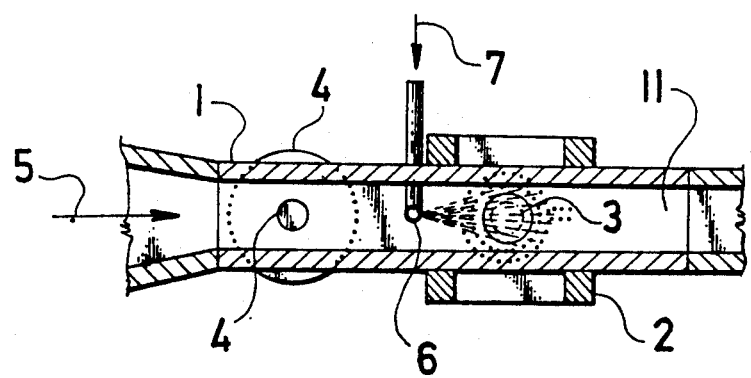

An optical detection of $O_2(^1\Delta_g)$ 4 and $I_2$ injector 6 are fixed to a rectangular duct 11 in the laser body 1. The arms of resonator 9 affixed to the laser body 1 are equiped with inner mirrors which are purged with argon 8. Outside the laser body there are two coils 2 without a core serving as a source of magnetic field. Their construction ensures a quasihelmholtz geometry in the transverse profile of the active zone.

A COIL works with a gas mixture containing singlet oxygen which flows in direction 5 and reacts with molecular iodine. Iodine 7 is introduced into the active zone 3 by an injector 6. The laser effect itself occures in the part of active zone 3 between the mirrors of the optical resonator 9. When no current is flowing through the coils 2, the laser operates in the usual cw regime without an external modulation. When an electric current is supplied to the coils 2, the effect described above takes place.

An application of the invention to original cw COIL system makes it possible to use this laser as a tool in industrial technologies where high powers are needed and the wavelength of 1,315 μm is advantageous.

We claim:

1. A method of modulating a continuously pumped chemical oxygen-iodine laser having a body containing an optical resonator and a laser active zone in the resonator where oxygen and iodine react to generate laser light, comprising:
generating a magnetic field of intensity up to 800 $A.cm^{-1}$, externally of the body, the magnetic field extending into the laser active zone, and varying the intensity of the magnetic field according to a selected timing for modulating an output power of laser light from the optical resonator according to the selected timing.

2. A method according to claim 1, wherein the laser has a threshold gain of output power generation, the selected timing being periodic and the intensity of the magnetic field being changed periodically between a zero value and a value corresponding to the threshold gain or an underthreshold gain of the output power for generating a periodically pulsed regime of output power generation for the laser.

3. A method according to claim 1, wherein the laser has a threshold gain of output power generation, the selected timing including abruptly changing the intensity of the magnetic field from a zero value to a value for the magnetic field intensity which lowers the gain of the laser to the threshold gain or to an underthreshold gain, for switching-off of the output power of the laser light.

4. A method according to claim 1, wherein the laser has a threshold gain of output power generation, the selected timing includes a continuous change of the intensity of the magnetic field in a range between a zero value and a value corresponding to the threshold gain of the output power for continuously adjusting the output power of the laser in the range of zero to 100% of a continuous wave value for the laser.

5. A method according to claim 1, wherein the laser has a laser gain which fluctuates in a manner that depends on an output power of the laser, the selected timing changing the magnetic field intensity for increasing and decreasing the laser gain to compensate for the fluctuations for temporally stabilizing the output power of the laser. stabilizing the output power of the laser.

6. A method according to claim 1, wherein the laser resonator has an optical axis and the laser active zone contains gases flowing in a flow direction, the magnetic field being oriented so that it is perpendicular to the optical axis and to the gas flow direction.

7. A method according to claim 2, wherein the laser resonator has an optical axis and the laser active zone contains gases flowing in a flow direction, the magnetic field being oriented so that it is perpendicular to the optical axis and to the gas flow direction.

8. A method according to claim 3, wherein the laser resonator has an optical axis and the laser active zone contains gases flowing in a flow direction, the magnetic field being oriented so that it is perpendicular to the optical axis and to the gas flow direction.

9. A method according to claim 4, wherein the laser resonator has an optical axis and the laser active zone contains gases flowing in a flow direction, the magnetic field being oriented so that it is perpendicular to the optical axis and to the gas flow direction.

10. A method according to claim 5, wherein the laser resonator has an optical axis and the laser active zone contains gases flowing in a flow direction, the magnetic field being oriented so that it is perpendicular to the optical axis and to the gas flow direction.

11. In combination with a continuously pumped chemical oxygen-iodine laser comprising a laser body defining a laser active zone, means for supplying oxygen to the laser active zone in a gas flow direction, a molecular iodine injector for injecting molecular iodine into the laser active zone and along the gas flow direction, a pair of optical resonator arms extending along an optical axis passing through the laser active zone and on opposite sides of the laser active zone for enhancing laser generation along the optical axis and due to a chemical reaction between oxygen and iodine in the laser active zone, the laser generation being at an output power, a device for modulating the output power of the laser generation comprising magnetic field generating means connected externally of the laser active zone for generating a magnetic field in the laser active zone, an intensity of the magnetic field being variable for varying the output power of the laser generation.

12. The combination of claim 11, wherein the magnetic field generating means comprises a pair of rectangular coils without cores positioning externally of the laser body on opposite sides of the laser active zone, the rectangular coils being arranged in a quasihelmholtz geometry.

13. The combination of claim 12, wherein the coils are positioned to generate a magnetic field which is perpendicular to the optical axis and to the gas flow direction.

* * * * *